May 15, 1928.  
J. H. CALBECK  
1,669,857  
CRUDE LITHOPONE AND IMPROVED METHOD OF MANUFACTURING THE SAME  
Filed Jan. 21, 1926
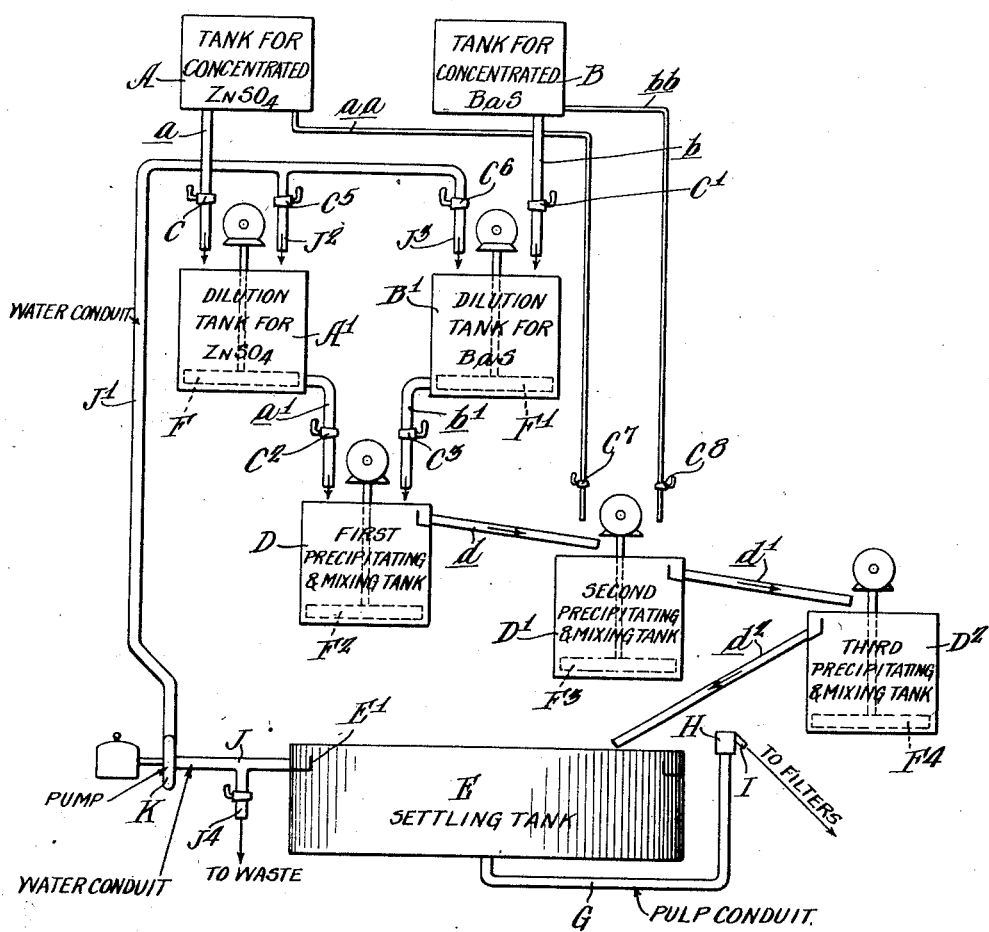
Inventor  
John H. Calbeck  
by Francis J. Chambers  
his Attorney.

Patented May 15, 1928.

1,669,857

UNITED STATES PATENT OFFICE.

JOHN H. CALBECK, OF JOPLIN, MISSOURI, ASSIGNOR TO THE EAGLE-PICHER LEAD COMPANY, OF CINCINNATI, OHIO, A CORPORATION OF OHIO.

CRUDE LITHOPONE AND IMPROVED METHOD OF MANUFACTURING THE SAME.

Application filed January 21, 1926. Serial No. 82,660.

My invention relates to the manufacture of lithopone and has for its object the production of a crude lithopone of a distinctive character by a method which will insure that the lithopone shall at all times be precipitated under the same conditions—that is to say, in mixtures of aqueous solutions of zinc sulphate and barium sulphide the composition and concentration of which remain approximately constant; a further object which I have in view is to bring about the precipitation of the lithopone in highly diluted mixed solutions of the zinc sulphate and barium sulphide and under conditions which make this economically practicable. By bringing about the precipitation of lithopone under these conditions I insure a lithopone of remarkably even quality and of which the precipitated particles and the pulp which they form have remarkably good qualities, as will be pointed out later.

My invention generally speaking consists in the method of precipitating lithopone in which solutions of zinc sulphate and of barium sulphide, preferably highly diluted, are continuously run in reactive proportions into a precipitating and mixing tank in which the liquids and suspended particles of precipitate are maintained at a constant level and continuously drawn off, preferably through additional precipitating and mixing tanks into a tank in which the lithopone pulp is permitted to settle and from which it is drawn off for further treatment of the usual kinds. My invention also consists in the new crude lithopone produced by my process which has distinctive qualities as compared with crude lithopone as heretofore produced.

My new method will be best understood as further described in connection with the drawing which is a diagrammatic chart of apparatus suitable for the practice of my invention and in which A and B are, respectively, reservoir tanks for zinc sulphate and for barium sulphide, the solutions of which may properly be of the usual density of these solutions as usually employed in the manufacture of lithopone by the usual methods. $A^1$ and $B^1$ are tanks in which the solutions from tanks A and B are diluted. The strong solutions running out through pipes $a$ and $b$ and being controlled by valves C and $C^1$ so that they will flow to tanks $A^1$ and $B^1$ in reactive proportions. Stirrers F and $F^1$ are provided to insure a homogeneous mixture with the diluting water which is run from conduit $J^1$ into tanks $A^1$ and $B^1$ through nozzles $J^2$ and $J^3$ provided with regulating cocks $C^5$ and $C^6$. The dilute solutions are run through pipes $a^1$ and $b^1$ into the precipitating and mixing tank D. Valves $C^2$ and $C^3$ regulating the flow to reactive proportions. The lithopone particles precipitated in tank D are maintained in suspension in the tank by a stirrer $F^2$ and the liquid contents of the tank is maintained at a constant level running out from near the top of the tank through a conduit $d$.

As shown, and by preference, the conduit $d$ delivers the liquid and suspended precipitate into another precipitating and mixing tank $D^1$ having a stirrer $F^3$ and an outer conduit $d^1$ delivering the liquid and precipitate to still another precipitating and mixing tank $D^2$ having a stirrer $F^4$ and an outer conduit $d^2$ leading to a settling tank E in which the lithopone particles are deposited in a pulp at the bottom and continuously drawn off through conduit C by pump H and delivered through conduit I to filters (not shown).

The water flowing into gutter $E^1$ at the top of tank E, together with water soluble salts, is drawn off through pipe J and forced by pump K through conduit $J^1$.

Conduits $aa$ and $bb$ having regulating valves $C^7$ and $C^8$ lead from tanks A and B into tank $D^1$ and can be used to correct any error as to the reactive proportions of the solution which may appear by analysis of the outflow from tank D.

It will be obvious that the advantages incident to precipitating the lithopone under uniform conditions are secured irrespective of the strength of the barium and zinc solutions employed in the process. Marked advantages are, however, secured by carrying out my method with solutions of considerable dilution as compared with those heretofore employed in making lithopone by usual methods. For example, in commonly used methods it is not advisable to use barium liquors of lower concentration than 10%, barium sulphide, or zinc liquors of lower concentration than 14% $ZnSO_4$. In my method I find it advisable to dilute the solution so that at the time of reaction the strength should not exceed one tenth of that normally used, that is to say I dilute the barium sulphide solutions to a concentration of not exceeding 1% BaS and the zinc sulphate solutions to a concentration not exceeding 1.4% ZnSO$_4$. In preference I use a barium liquor of about 1% and a zinc liquor of about 1%. The crude lithopones produced by my process, especially where the barium and zinc solutions are diluted not to exceed a concentration of 1%, has marked advantages over crude lithopones heretofore produced. Thus (1) my lithopone if the freshly precipitated pulp is flowed on a sheet of glass coats it with a uniform smooth opaque coating; (2) the pulp settles more rapidly and contains less water to be filtered out; (3) my crude lithopone has a much higher strength and hiding power than ordinary crude lithopone and possesses high oil absorption; (4) my lithopone requires a materially less muffling temperature to obtain maximum strength in the finished product. For example, I have found that a muffling temperature of 950° F. is sufficient with my product and that is about 200° F. less than is usually necessary; (5) my crude lithopone occludes less of the electrolyte used in precipitation than is found in lithopone produced by known methods, so that, for instance, three or more times as much chloride can be used as compared with known processes and yet a light proof lithopone produced; (6) the ultimate particle of lithopone formed by my process is larger, more stable and more definitely formed than is the case with crude lithopone as heretofore produced. Thus the ultimate particle in my crude lithopone will have a magnitude approximating that of a good average pigment particle, say from .5 to .85 microns, making the crude lithopone a not unsatisfactory pigment and making it possible to impart to the product the maximum color strength and opacity by muffling the crude product at a temperature much lower than has heretofore been necessary. Thus I find that my crude lithopone made of chlorine free liquors can be brought to the maximum strength by muffling it at a temperature 200° F. below that usually found necessary, say at a temperature of about 950° F.

Having now described my invention, what I claim as new and desire to secure by Letters Patent is:

1. In the manufacture of lithopone the method of producing crude lithopone of high quality which consists in continuously running aqueous solutions of zinc sulphate and of barium sulphide in reactive proportions into a precipitating and mixing tank, energetically stirring the contents of said tank, continuously drawing off the contents of said tank in such manner as to maintain an approximately constant level therein and approximately constant concentration of the liquid contents thereof and settling out a lithopone pulp from the mixture drawn from the tank.

2. In the method of claim 1 the further step of continuously passing the mixture from the precipitating and mixing tank through one or more similar precipitating and mixing tanks prior to settling out the pulp so as to insure a complete reaction.

3. The method of claim 1 as carried out with dilute solutions of zinc sulphate and barium sulphide of materially less than 10% concentration.

4. The method of claim 1 as carried out with dilute solutions of zinc sulphate and barium sulphide of approximately 1% concentration.

5. In the method of claim 1, the further step of continuously diluting concentrated solutions of zinc sulphate and barium sulphide preparatory to the continuous delivery of the dilute solutions into the precipitating and mixing tank.

JOHN H. CALBECK.

DISCLAIMER.

1,669,857.—*John H. Calbeck*, Joplin, Mo. CRUDE LITHOPONE AND IMPROVED METHOD OF MANUFACTURING THE SAME. Patent dated May 15, 1928. Disclaimer filed April 23, 1929, by the patentee and the assignee, *The Eagle-Picher Lead Company*.

Hereby enter this disclaimer to that part of the claims in said specification which is in the following words, to wit:

"1. In the manufacture of lithopone the method of producing crude lithopone of high quality which consists in continuously running aqueous solutions of zinc sulphate and of barium sulphide in reactive proportions into a precipitating and mixing tank, energetically stirring the contents of said tank, continuously drawing off the contents of said tank in such manner as to maintain an approximately constant level therein and approximately constant concentration of the liquid contents thereof and settling out a lithopone pulp from the mixture drawn from the tank.

"2. In the method of claim 1 the further step of continuously passing the mixture from the precipitating and mixing tank through one or more similar precipitating and mixing tanks prior to settling out the pulp so as to insure a complete reaction."

[*Official Gazette May 7, 1929.*]